(12) United States Patent
Hesse et al.

(10) Patent No.: US 6,944,725 B2
(45) Date of Patent: Sep. 13, 2005

(54) RECIPROCALLY ADJUSTABLE DUAL QUEUE MECHANISM

(75) Inventors: Siegfried Kay Hesse, Dresden (DE); Dale E. Gulick, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 262 days.

(21) Appl. No.: 10/283,733

(22) Filed: Oct. 30, 2002

(65) Prior Publication Data

US 2003/0204686 A1 Oct. 30, 2003

(30) Foreign Application Priority Data

Apr. 30, 2002 (DE) .......................................... 102 19 359

(51) Int. Cl.⁷ ............................................. G06F 12/00
(52) U.S. Cl. ......................... 711/154; 711/137; 710/56
(58) Field of Search .................................. 711/137, 154, 711/170, 173; 710/56, 117

(56) References Cited

U.S. PATENT DOCUMENTS

| | | | | |
|---|---|---|---|---|
| 5,043,981 A | | 8/1991 | Firoozmand et al. ....... 370/235 |
| 5,381,528 A | * | 1/1995 | Brunelle ...................... 710/56 |
| 5,621,898 A | * | 4/1997 | Wooten ....................... 710/117 |
| 6,044,418 A | * | 3/2000 | Muller ......................... 710/56 |
| 6,145,061 A | * | 11/2000 | Garcia et al. ................ 711/154 |
| 6,314,494 B1 | * | 11/2001 | Keltcher et al. ............. 711/137 |
| 6,466,579 B1 | * | 10/2002 | Scott et al. ............. 370/395.71 |
| 6,782,461 B2 | * | 8/2004 | Lam ............................ 711/170 |
| 2003/0120886 A1 | * | 6/2003 | Moller et al. ............... 711/173 |

FOREIGN PATENT DOCUMENTS

DE 19740738 3/1999

* cited by examiner

*Primary Examiner*—Nasser Moazzami
(74) *Attorney, Agent, or Firm*—Meyertons Hood Kivlin Kowert & Goetzel, P.C.; B. Noël Kivlin

(57) ABSTRACT

A data storage mechanism is provided where a plurality of data items are stored in a plurality of register elements. Each registered element is capable of storing at least one data item. The plurality of register elements is arranged to form a sequence of register elements. First data is stored in a first part of the sequence and second data is stored in a second part of the sequence. The first part and the second part are of variable lengths with the sum of the variable lengths being equal to the lengths of the sequence of register elements. Thus, a double-ended queue mechanism is provided which may be used to store data of different type or data which is either scheduled periodically or asynchronously. The mechanism may be used in a USB 2.0 compliant host controller.

4 Claims, 11 Drawing Sheets

RECIPROCALLY ADJUSTABLE DUAL QUEUE MECHANISM

BACKGROUND OF THE INVENTION

1. Field of the Invention

The invention generally relates to queue mechanisms, and in particular to controlled data storage units and corresponding methods for storing a plurality of data items.

2. Description of the Related Art

Common motherboard layouts comprise a number of hardware components including a CPU (Central Processing Unit), a northbridge, a southbridge, and system memory. The northbridge usually is a single chip in a core-logic chipset that connects the processor to the system memory and, e.g., AGP (Accelerated Graphic Port) or PCI (Peripheral Component Interface) buses. The southbridge is usually the chip in a system core-logic chipset for controlling the IDE (Integrated Drive Electronics) or EIDE (Enhanced IDE) bus, the USB (Universal Serial Bus) bus, providing plug-n-plug support, controlling a PCI-ISA (Industry Standard Architecture) bridge, managing the keyboard/mouse controller, providing power management features, and controlling other peripherals. For controlling the USB bus, southbridges often include a USB host controller. Southbridges and northbridges may also be integrated in one single chip.

In computer systems in general, and in particular in USB host controllers, data management is an important task to be dealt with. For instance there may be data of different types to be handled with, and even with data of the same type, the handling may differ dependent on the actual function to be performed. For instance, there may be data items which are to be read from or written to memory on a periodical schedule while other data items are fetched or written asynchronously. Further, there may be data which needs to be fetched immediately when being requested, while other data can be pre-fetched in advance.

All data which is fetched or pre-fetched, or which is to written into memory, is usually stored in some kind of buffers. A known concept for such buffers is that of first-in-first-out (FIFO) buffers which can be thought as being a sequence of register elements which are filled from one side and emptied from the other side. Such buffers can be considered as a queue since the data is stored to form a sequence.

Other well known storage objects are double-ended queues which can be manipulated by a variety of functions which allow items to added either at the beginning of the queue, the end of the queue or at some specific points within queue. However, such storage objects may still have the disadvantage that they are usually suitable for one data type and one kind of data scheduling only. That is, if there are data items of two types to be stored, two separate storage units need to be provided.

As an example, FIG. 1 shows the case where data are to be stored either periodically or asynchronously. For this purpose, there are two separate storage circuits 100 and 110 provided which may be first-in-first-out buffers or another kinds of queues. Two separate buffers as depicted in FIG. 1 are however disadvantageous since each buffer requires a significant amount of hardware circuitry on the integrated circuit chip. This leads to increased circuit development and manufacturing costs and further makes it more difficult to scale the circuits down to a smaller size.

SUMMARY OF THE INVENTION

An improved data storage management technique is provided that may handle data of different types or different schedules in a more efficient manner.

In one embodiment, an apparatus is provided that comprises a data storage unit for storing a plurality of data items, and a controller for controlling the data storage unit. The data storage unit includes a plurality of register elements, where each register element is capable of storing at least one data item. The plurality of register elements is arranged to form a sequence of register elements. The controller is arranged for controlling the data storage unit to store first data in a first part of the sequence of register elements and second data in a second part of the sequence of register elements. The first part and the second part are of variable lengths with the sum of the variable lengths being equal to the length of the sequence of register elements.

In another embodiment, a southbridge integrated circuit chip is provided. The chip comprises data storage circuitry for storing a plurality of data items. The data storage circuitry includes a plurality of register elements where each register element is capable of storing at least one data item. The plurality of register elements are arranged to form a sequence of register elements. The chip further comprises control circuitry for controlling the data storage circuitry to store first data in a first part of the sequence of register elements and second data in a second part of the sequence of register elements. The first part and the second part are of variable lengths with the sum of the variable lengths being equal to the length of the sequence of register elements.

In a further embodiment, there may be provided a method of operating a data storage unit to store a plurality of data items. The data storage unit includes a plurality of register elements. Each register element is capable of storing at least one data item. The plurality of register elements are arranged to form a sequence of register elements. The method comprises controlling the data storage unit to store first data in a first part of the sequence of register elements, and controlling the data storage unit to store second data in a second part of the sequence of register elements. The first part and the second part are of variable lengths and the sum of the variable lengths is equal to the length of the sequence of register elements.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 1:
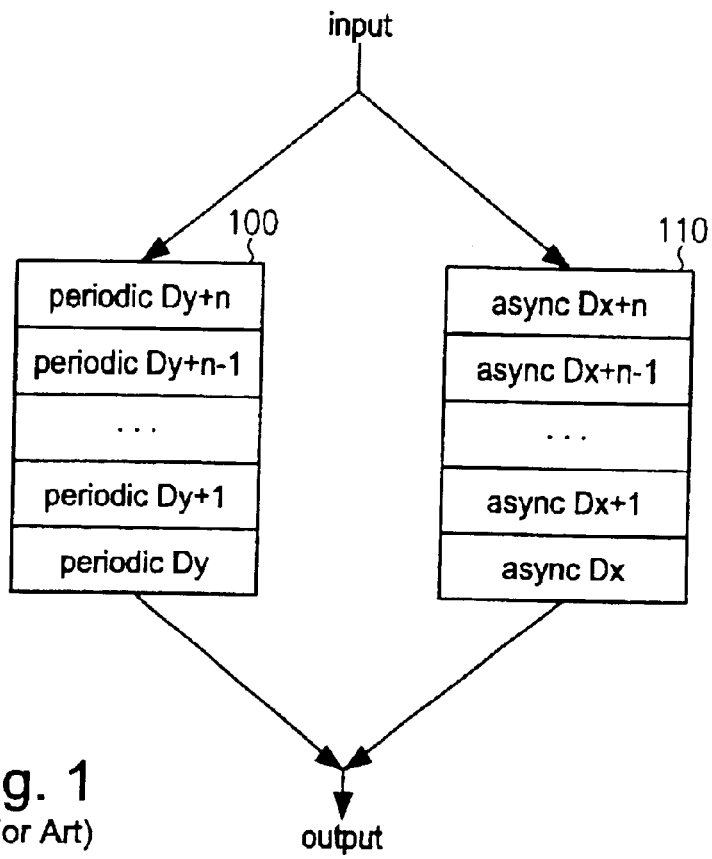
FIG. 1 illustrates a conventional scheme of storing data periodically as well as asynchronously.
Figure 2:
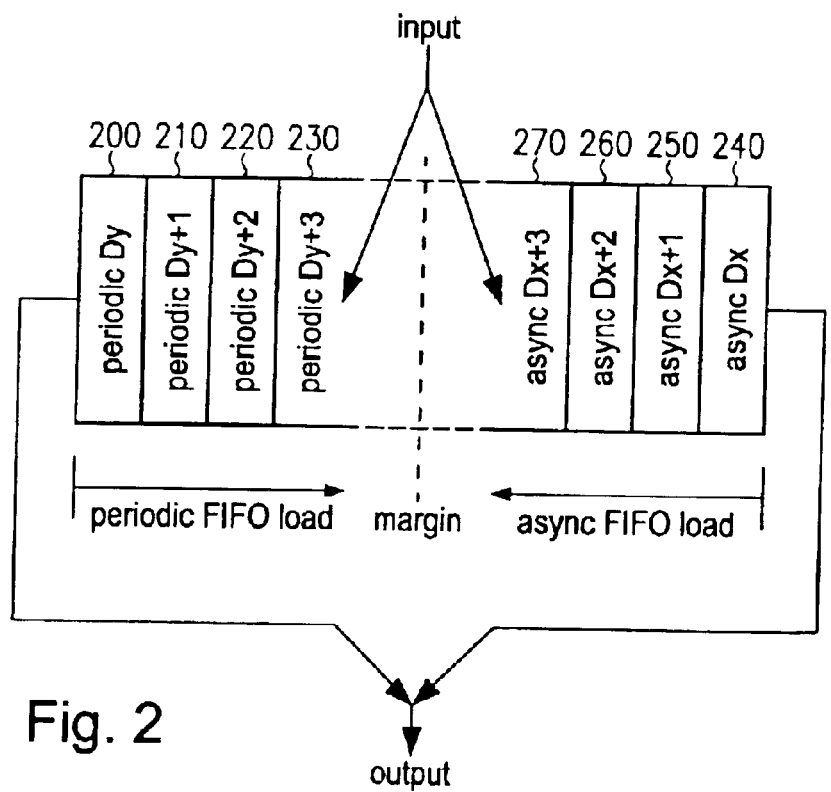
FIG. 2 illustrates a data storage unit according to a first embodiment.

Referring now to the drawings and particularly to FIG. 2, which illustrates a data storage unit according to an embodiment, the data storage unit includes a plurality of registers element 200–270 which are arranged to form a sequence. That is, there is one register element 200 which forms a first end of the sequence, and another register element 240 which forms the other end of the sequence. Each other register element 210–230, 250–270 has exactly two neighbouring register elements. This organization may be realized physically, meaning that the register elements are located side by side on the chip, or logically, meaning that the register elements are sequentially addressable.

Each register element 200–270 is for storing one data item. In another embodiment, a register element may store more than one data items. A data item may be a transaction item.

In the embodiment of FIG. 2, input data is provided from memory fetch, and output data is provided to the USB transaction builder. There are periodic and asynchronous transactions, and the periodic transactions are filled in from right to left while the asynchronous transactions are filled in from left to right. The middle line represents a margin which separates the data storage unit into a periodic part and an asynchronous part. The margin can be changed so that the length of the periodic part as well as the length of the asynchronous part are variable. The sum of both variable lengths is equal to the lengths of the entire sequence.

As apparent from FIG. 2, a data storage unit can be considered as double-ended queue mechanism having two queues linked together. Thus, a mechanism is provided which may be used to store data of different type or data which is either scheduled periodically or asynchronously. This allows buffer space sharing/optimization based on the current work load. Moreover, the margin adjustment makes a history-based adaptation mechanism possible, and may save area on the chip.

Given the logical appearance as shown in FIG. 2, the functionality of the double-ended queue extends that of plain first-in-first-out buffers in that it allows to keep pre-fetched asynchronous descriptors while efficiently using all free space to pre-fetch periodical descriptors.

Figure 3:
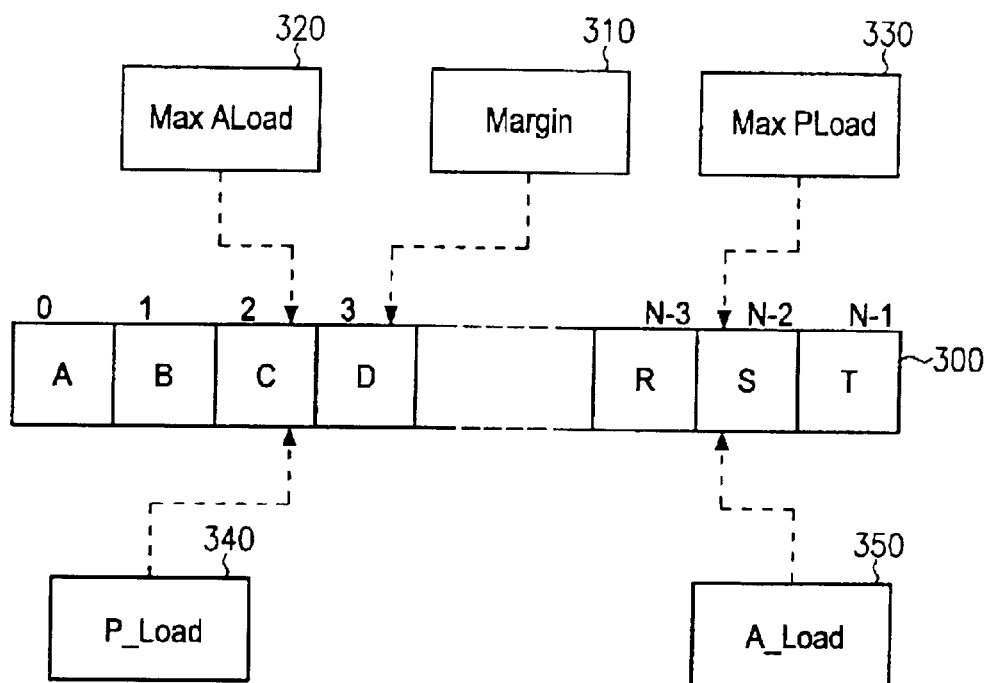
FIG. 3 illustrates a data storage unit according to a second embodiment.

Turning now to FIG. 3 which illustrates another embodiment, control of the double-ended queue mechanism is established by a special index register 300. There is one index register place for every queue entry. The contents of one index register place (designated by the numbers 0 . . . N−1) is a base address for one descriptor within a RAM (Random Access Memory), designated by the characters A . . . D and R . . . T. The head of the periodic queue is stored in place 0 of the index register 300, the head of the asynchronous queue resides in place N−1. As shown in FIG. 3, the next periodic descriptor loaded into the RAM would be stored starting at address C, the next asynchronous descriptor at address S. Thus, the data items stored in the register places of index register 300 may be pointers to a RAM.

The double-ended queue of FIG. 3 may operate in two different modes: push margin mode and load limit mode. When in load limit mode, each side can grow until it either hits its maximum load value 320, 330 or the tail of the other side. Thus, queue entries between MaxALoad 320 and MaxPLoad 330 are used for either type. That is, in the load limit mode, there may be an overlap of the two parts. When in push margin mode, each side is allowed to grow only until it hits the margin 310. These hits during a microframe are latched and used to update the margin 310 within the limits given by MaxALoad 320 and MaxPLoad 330. Thus, the margin 310 is in this case adapted based on scheduling history.

In the following, the operation of the data storage unit shown in FIGS. 2 and 3 will be discussed in more detail, making use of the parameters shown in FIG. 3: the margin 310, the maximum load values MaxALoad 320 and MaxPLoad 330, and the current tail pointers P_Load 340 and A_Load 350.

Figure 4:
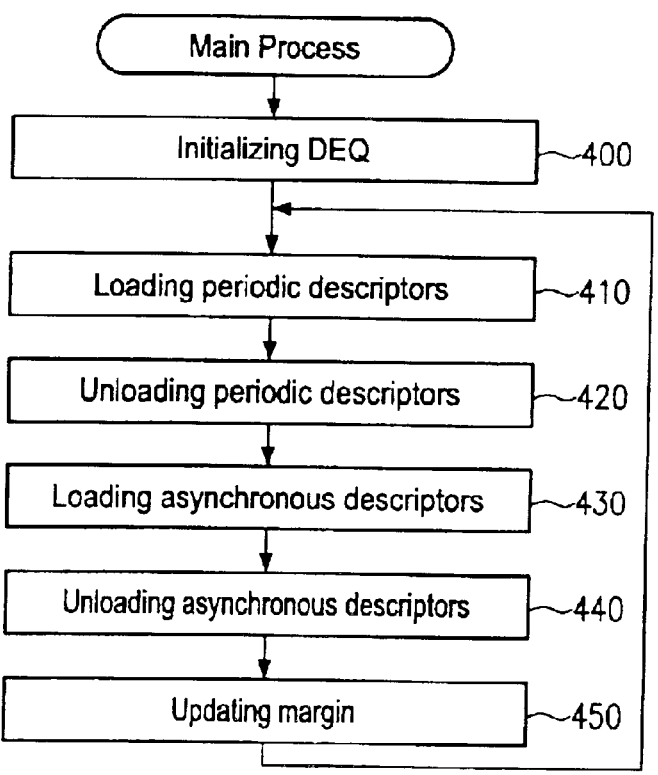
FIG. 4 is a flowchart illustrating the main process of operating the data storage units as shown in FIG. 2 or 3, according to an embodiment.

Turning first to the flowchart of FIG. 4, the main process of operating the data storage unit starts with an initialization in step 400. Once the double-ended queue is initialized in step 400, periodic and asynchronous descriptors are loaded and unloaded in steps 410 to 440. While the flowchart of FIG. 4 indicates a certain sequence of steps 410 to 440, it is to be noted that other sequences may also be possible. Some or all of the loading and unloading steps for either kinds of descriptors may also be interlocking in another embodiment. As apparent from FIG. 4, the process is performed iteratively, with each iteration including a margin update step 450.

Figure 5:
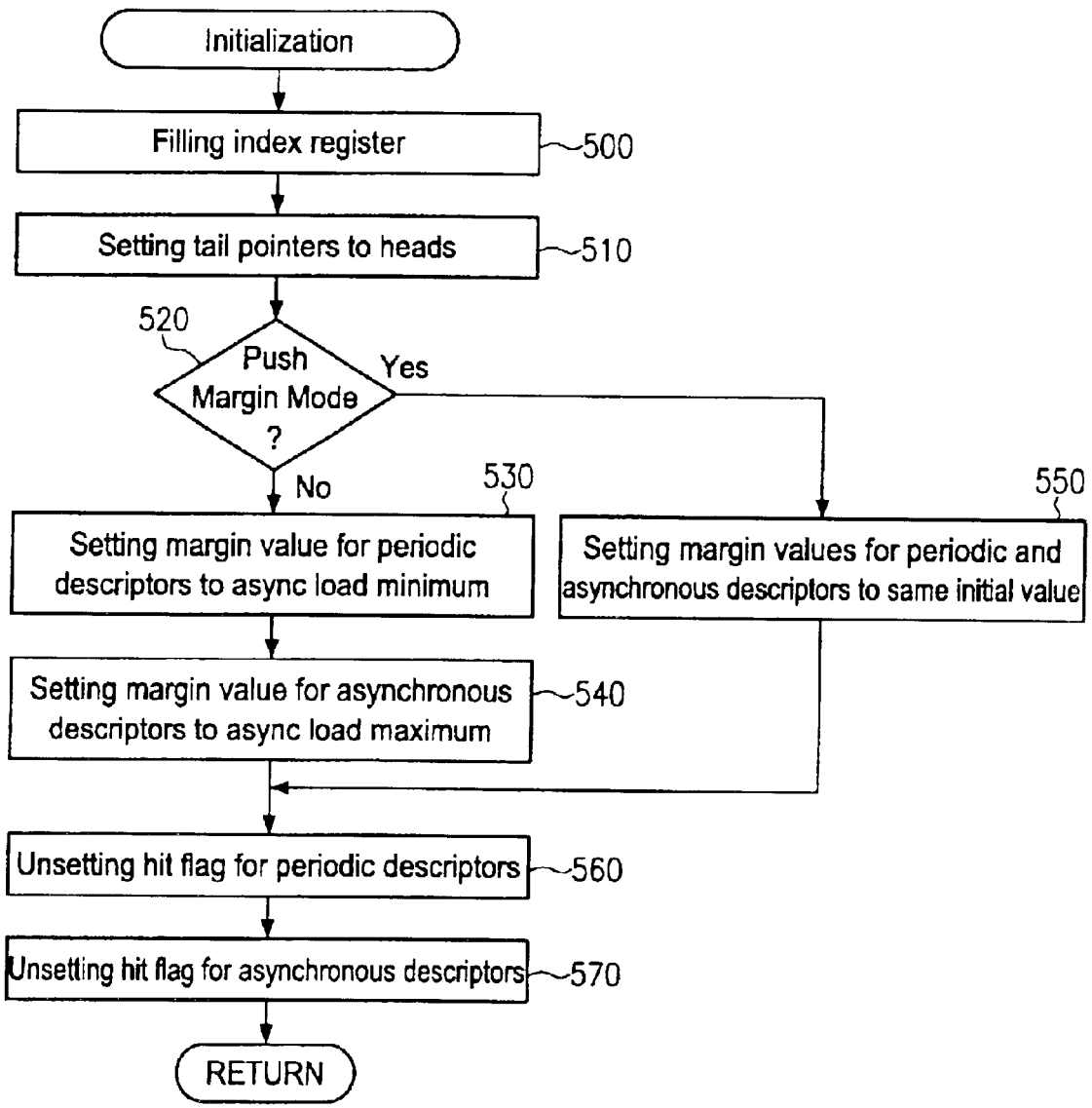
FIG. 5 is a flowchart illustrating the initialization performed in the process of FIG. 4.

Discussing first the initialization process which is performed in step 400 of the process shown in FIG. 4, reference is made to FIG. 5. First, the index register 300 is filled with initial values in step 500. In an embodiment, these values may just be incremented integer numbers. Then, the tail pointers 340, 350 are set to point to the heads of both parts (step 510). That is, P_Load 340 is initially set to point to place 0 of the index register 300, while A_Load 350 is set to point to place N−1.

It is then determined in step 520 whether the push margin mode or the load limit mode is set. If the push margin mode is set, the margin values for periodic and asynchronous descriptors are set to the same initial value in step 550. If the double-ended queue is however operated in the load limit mode, the margin value for the periodic descriptors is set to the minimum asynchronous load in step 530 while the margin value for asynchronous descriptors is set to the maximum of the asynchronous load (step 540). Then, hit flags for both periodic and asynchronous descriptors are unset in steps 560 and 570. As will be described in more detail below, hit flags are indications used when updating the margins.

Figure 6:
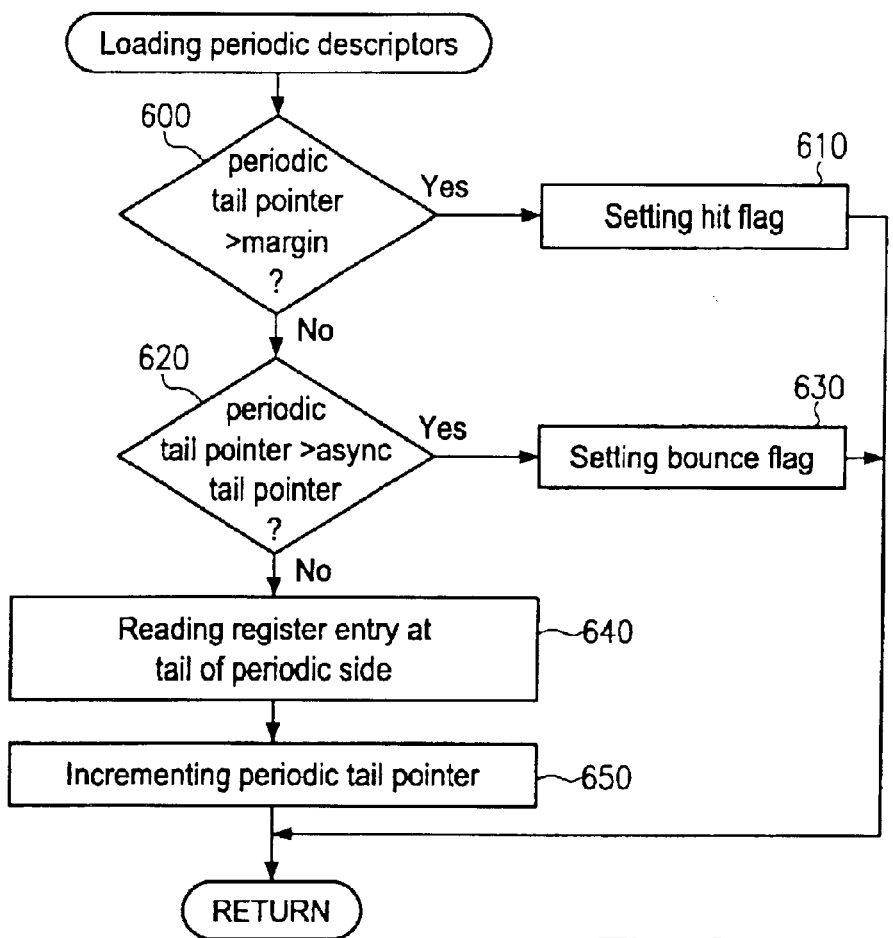
FIG. 6 is a flowchart illustrating the process of loading periodic descriptors in the process of FIG. 4.

Turning now to FIG. 6, the process of loading periodic descriptors is explained in more detail. First, it is determined in step 600 whether the periodic tail pointer 340 points to a register place beyond the margin value for periodic descriptors. As can be seen from the discussion of the initialization process above, the margin value is a variable used in both the push margin mode and the low limit mode, and thus the margin values for periodic and asynchronous descriptors may differ or may be equal. If it is determined in step 600 that the periodic tail exceeds the margin, the corresponding hit flag is set in step 610. Otherwise, it is checked in step 620 whether the periodic tail pointer points to a register place beyond that to which the asynchronous tail pointer points. If this is the case, a bounce flag is set in step 630. Otherwise, the process proceeds with step 640 of reading a register entry at the tail of the periodic side, i.e. at the register element to which P_Load 340 points. Finally, the periodic tail pointer P_Load 340 is incremented in step 650.

Figure 7:
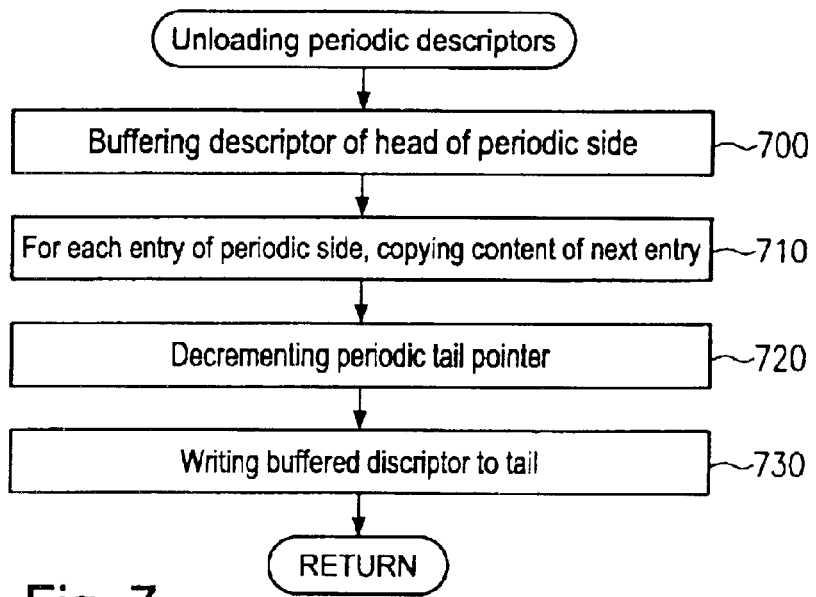
FIG. 7 is a flowchart illustrating the process of unloading periodic descriptors in the process of FIG. 4.

The unloading of periodic descriptors is illustrated in more detail in FIG. 7. First, the descriptor which is currently stored at the head of the periodic side is buffered in a temporary buffer in step 700 for later use. Then, for each entry of the periodic side the contents of the next entry is copied in step 710. Thus, what is actually done in step 710 is a rotation to the left. The periodic tail pointer P_Load 340 is then decremented in step 720 and the descriptor which was buffered in step 700 is written to the tail in step 730.

Figure 8:
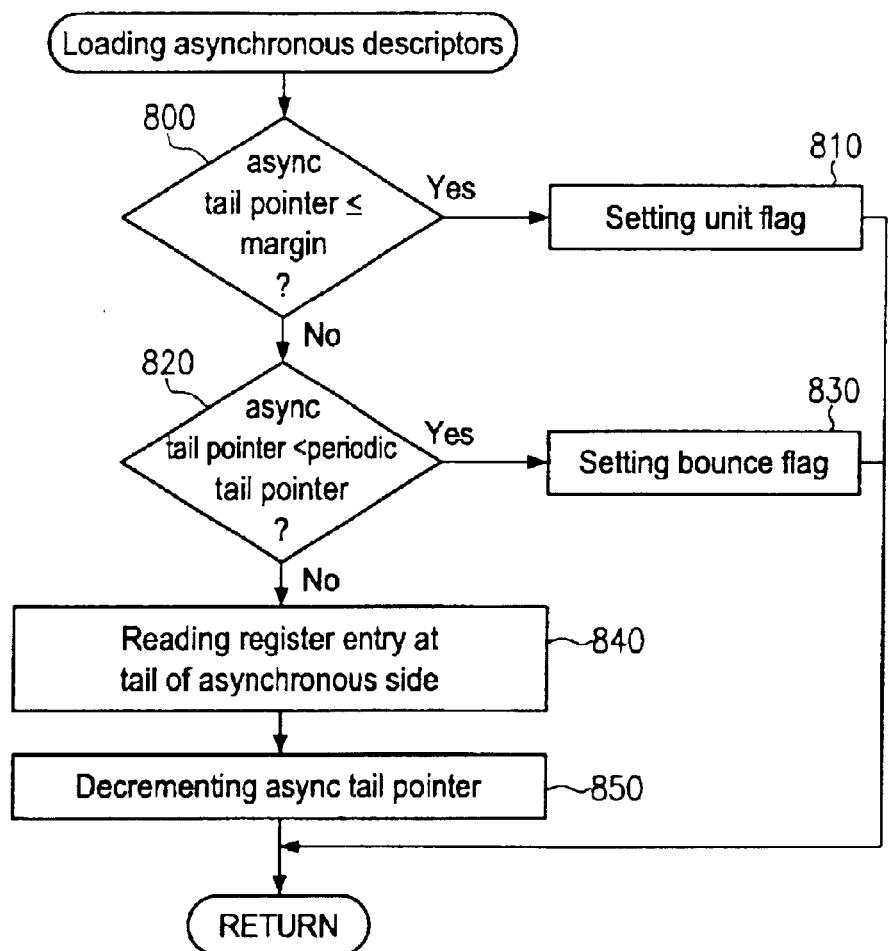
FIG. 8 is a flowchart illustrating the process of loading asynchronous descriptors in the process of FIG. 4.
Figure 9:
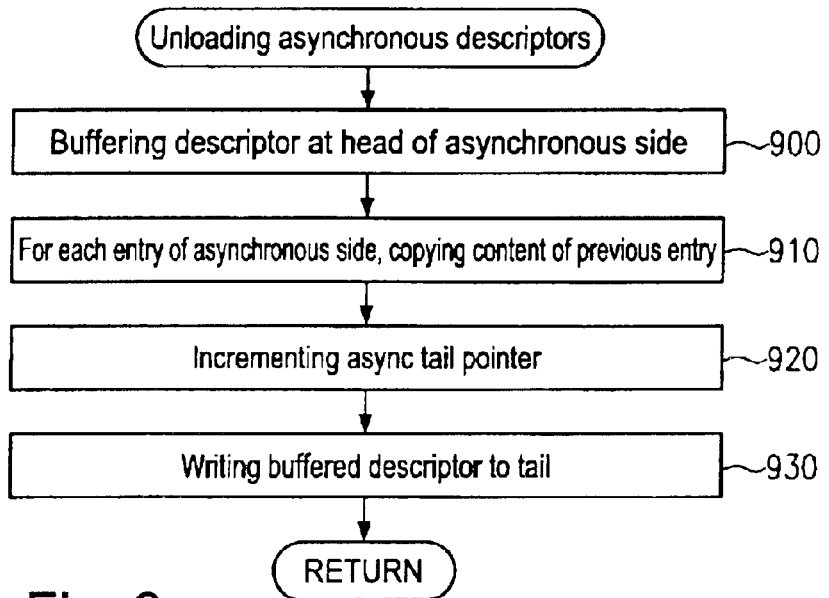
FIG. 9 is a flowchart illustrating the process of unloading asynchronous descriptors in the process of FIG. 4.

While FIGS. 6 and 7 show flowcharts for illustrating the loading and unloading process for periodic descriptors, corresponding flowcharts for processing the asynchronous descriptors are shown in FIGS. 8 and 9. These flowcharts are substantially the same as the ones discussed above but it should be mentioned that some modifications apply due to the fact that the asynchronous queue is filled in the opposite direction compared with the periodic queue. Thus, where pointers of the periodic queue were decremented, the corresponding pointers of the asynchronous side need to be incremented. Where in step 710 the contents of the next entry were copied to perform a rotation to the left, the contents of the previous entry needs to be copied at the asynchronous side, thereby rotating the data to the right.

Figure 10:
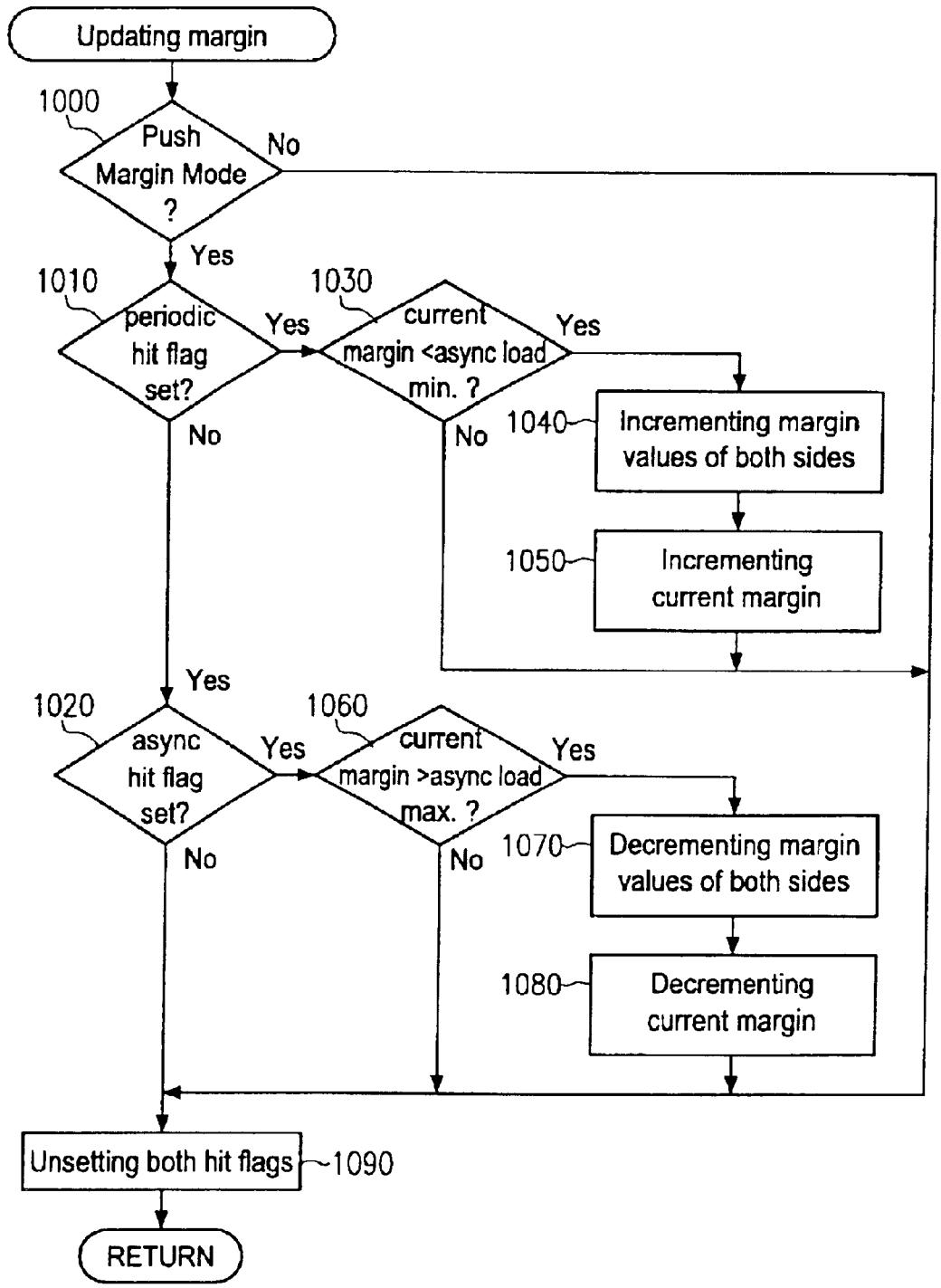
FIG. 10 is a flowchart illustrating the margin update process performed in the process of FIG. 4.

Turning now to FIG. 10, an embodiment of the margin update process is depicted which is to be performed in step 450 of the flowchart of FIG. 4. In step 1000, the mode of operation is determined. If the double-ended queue is operated in the load limit mode, the hit flags can be unset directly in step 1090. Otherwise, i.e. if the data storage unit is operated in the push margin mode, the further processing may depend on whether one of the periodic and asynchronous hit flags is set.

If it is determined in step 1010 that the periodic hit flag is set, a check is done to determine whether the current margin reaches the minimum asynchronous load (step 1030). If the periodic hit flag is set and the current margin reaches the asynchronous load minimum, the margin values are incremented in step 1040 and the current margin is also incremented in step 1050. Thus, the margin is updated to a higher value as there was still room for increasing the margin values without exceeding the minimum asynchronous load.

In steps 1020, 1060, 1070 and 1080, the corresponding process is performed in case the asynchronous hit flag is set.

Once the margin values are updated, the hit flags can be unset in step 1090.

While FIGS. 4 to 10 illustrate one embodiment of operating the double-ended queue, another embodiment will now be discussed with reference to FIGS. 11 and 12. In this embodiment, the periodic FIFO load may cross the middle of the queue and hit the asynchronous queue while the asynchronous FIFO load must not cross the middle (cf. FIG. 2). Further, an account is kept for an estimated time enroute (ETE) for all pending asynchronous transactions stored in the queue.

Figure 11:
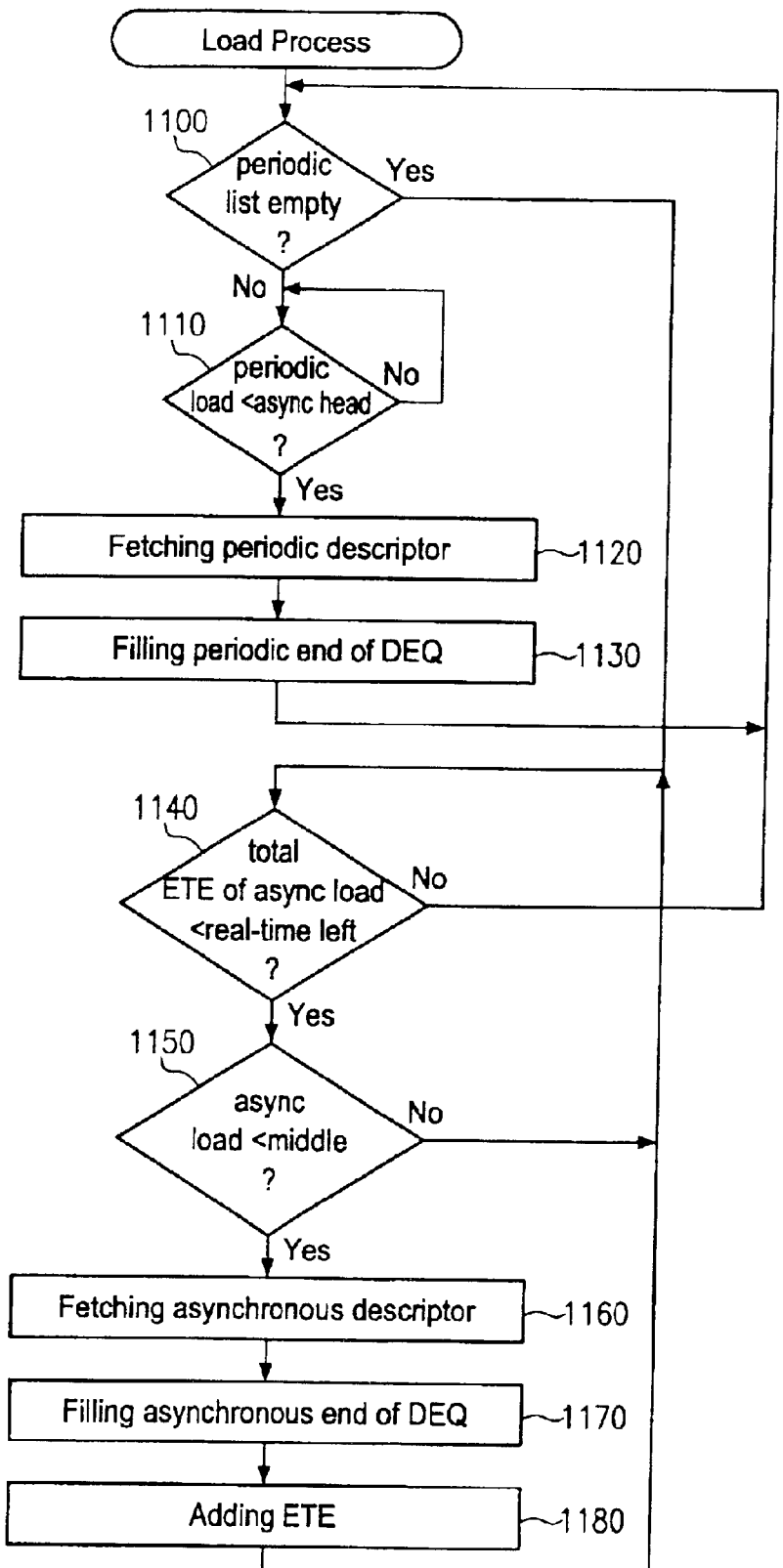
FIG. 11 is a flowchart illustrating a load process according to another embodiment.

Referring now to the flowchart of FIG. 11, a load process is depicted for loading periodic and asynchronous descriptors. In step 1100, it is determined whether the periodic list is empty. If so, the process proceeds with step 1140. Otherwise, the process freezes until the periodic load is below the asynchronous head (step 1110). Then, a periodic descriptor is fetched in step 1120 and the periodic end of the double-ended queue is filled in step 1130. The process then returns to step 1100.

If it is determined in step 1100 that the periodic list is empty, it is checked in step 1140 whether the total estimated time of the asynchronous load is below the real-time left in the microframe. If not, the process returns to step 1100. Otherwise it is checked in step 1150 whether the asynchronous load is below the middle of the queue. If so, an asynchronous descriptor is fetched in step 1160 and the asynchronous end of the double-ended queue is filled in step 1170, followed by step 1180 of adding the estimated time (ETE) of this transaction to the account of the total ETE. The process then returns to step 1140.

Figure 12:
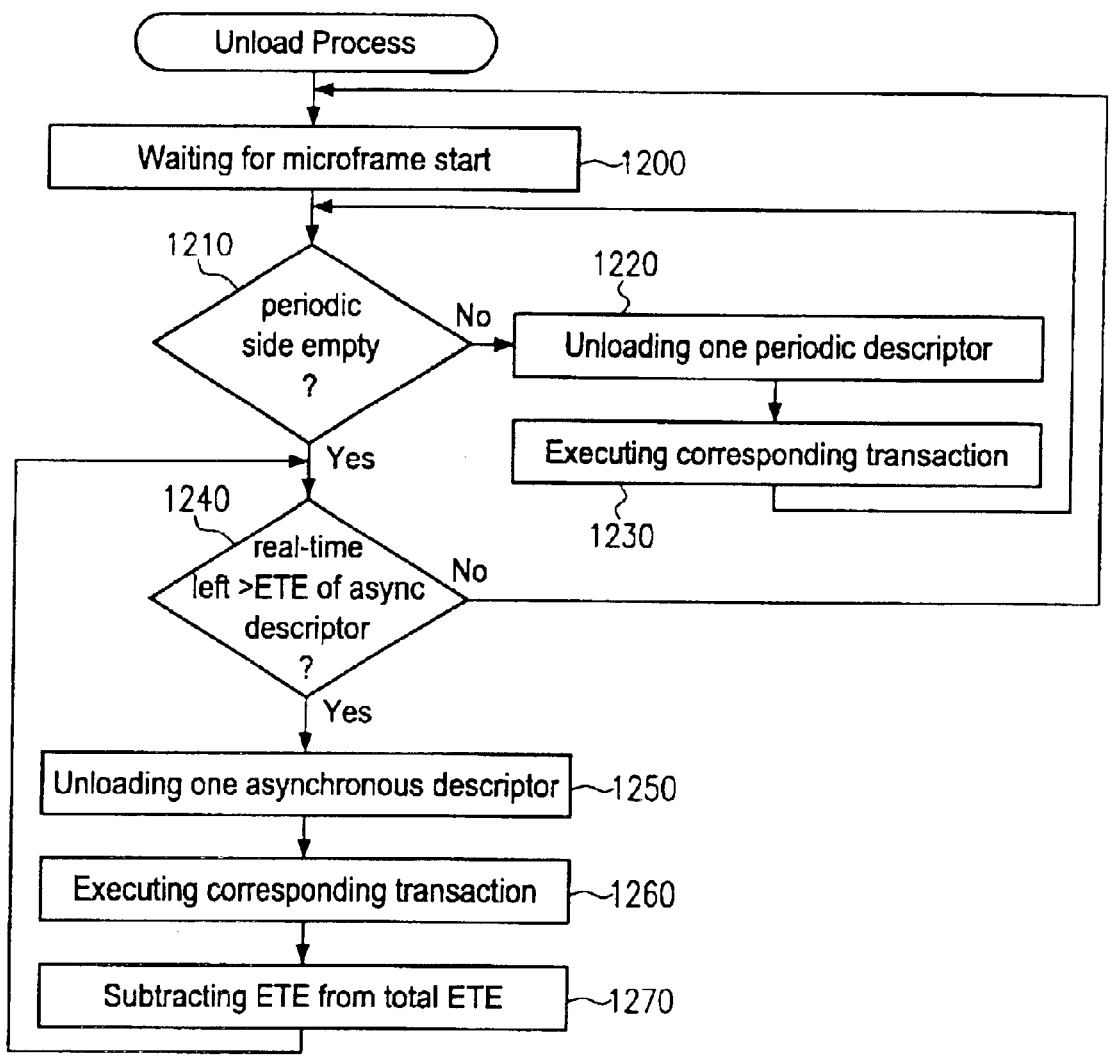
FIG. 12 is a flowchart illustrating an unload process according to another embodiment.

Referring now to FIG. 12, the unloading process of the present embodiment starts with step 1200 of waiting for the microframe start. It is then checked in step 1210 whether the periodic side is empty and if not, one periodic descriptor is unloaded and the corresponding transaction executed in steps 1220 and 1230. If the periodic side is empty, it is checked whether the real-time left exceeds the estimated time (ETE) of the asynchronous descriptor (step 1240). If so, one asynchronous descriptor is unloaded and the corresponding transaction executed in steps 1250 and 1260. Then, the estimated time is subtracted from the total ETE (step 1270). If it is however determined that no sufficient real-time is left, the process returns to step 1200 to wait for the next microframe start.

In an embodiment, the processes described above may be such that no periodic transactions are scheduled beyond the 80% margin. Also, the processes may include an adequate handling for transmission errors which might lead to a situation where not all periodic transactions are sent within the 80% margin. One possible solution would be a detection of such cases and flushing the periodic side. That is, the double-ended queue may be controlled to keep the filling state of one or both parts of the double-ended queue below a predefined percentage of the variable length of the respective part. In another embodiment, the double-ended queue may be controlled to keep the variable lengths of both parts below a predefined precentage of the length of the entire double-ended queue.

The process as discussed above in connection with FIGS. 11 and 12 may have the advantage of never throwing away already fetched asynchronous transactions when there is not enough time left in the microframe. Instead, they are moved to the next microframe.

Figure 13:
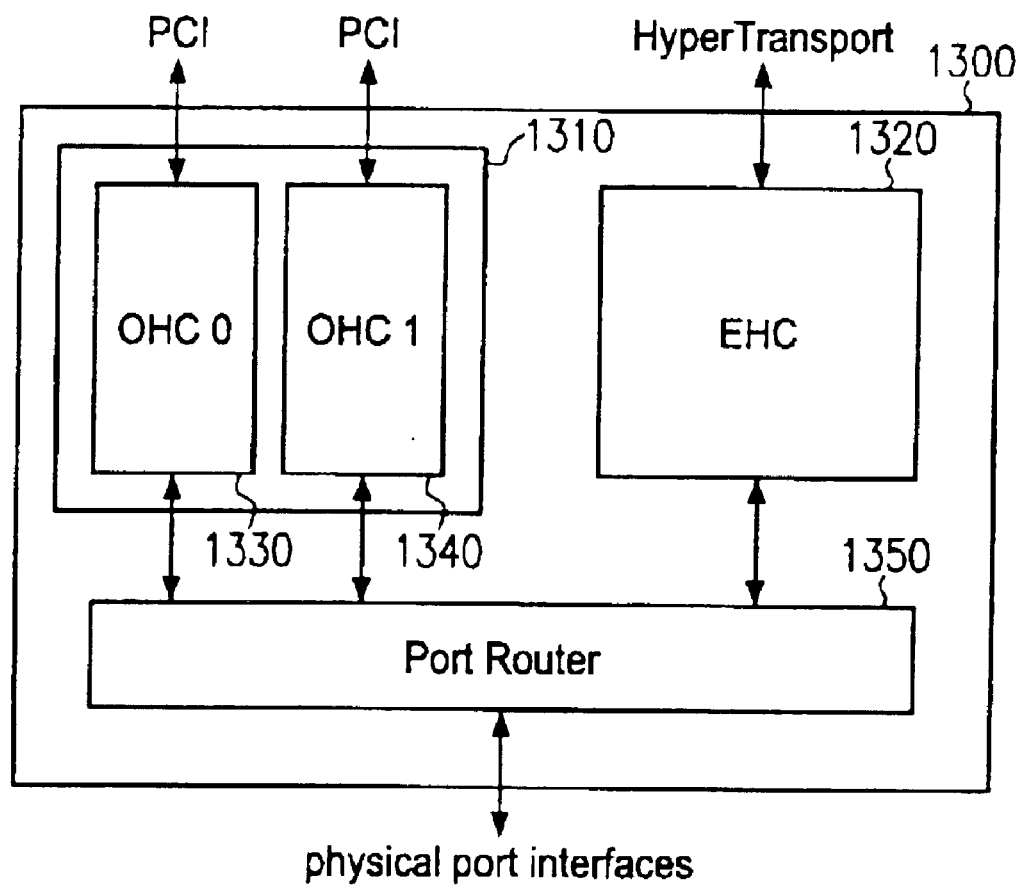
FIG. 13 illustrates the main components of a USB 2.0 compliant host controller according to an embodiment.

Turning now to FIG. 13, a USB 2.0 compliant host controller 1300 according to an embodiment is depicted. As apparent from the figure, there is one host controller 1320 which is an enhanced host controller (EHC) for the high speed USB 2.0 functionality. This host controller operates in compliance with the EHCI (Enhanced Host Controller Interface) specification for USB 2.0. On the software side, host controller 1320 has a specific host controller driver (EHCD) associated.

Further, there are host controllers 1310 for full and low speed operations. The UHCI (Universal Host Controller Interface) or OHCI (Open Host Controller Interface) are the two industry standards applied in the universal or open host controllers (UHC/OHC) 1310 for providing USB 1.1 host controller interfaces. The host controllers 1310 have assigned universal/open host controller devices (UHCD/OHCD) in the lowest software level.

In the companion host controller unit 1310 of the present embodiment, there are two OHCI compliant host controllers, OHC0 1330 and OHC1 1340. These controllers handle all USB 1.1 compliant traffic and may contain the legacy keyboard emulation for non-USB aware environments.

A port router 1350 may be provided for assigning the physical port interfaces their respective owners. This ownership is controlled by EHC registers, and per default all ports are routed to the companion host controllers in order to allow for a system with only USB 1.1 aware drivers to function. If a USB 2.0 aware driver is present in the system it will assign the ports to either a companion host controller 1330, 1340 for low and full speed devices and hubs (USB 1.1 traffic) or to the EHC 1320 for high speed devices and hubs.

That is, the USB 2.0 host controller shown in FIG. 13 complies with the EHCI specification and allows for using existing OHCI USB 1.1 host controllers with the minimum alteration necessary to interface to the port router block 1350, instead of USB 1.1 physical devices.

The USB 2.0 compliant host controller of FIG. 13 may be defined as hardware architecture to implement an EHCI-compliant host controller for integration into a southbridge. The host controller then resides between the USB-2 analog input/output pins and a link interface module for interfacing upstream towards system memory, e.g. interfacing to a northbridge if there is one present in the system. This interface may be an internal HyperTransport™ interface. The HyperTransport technology is a high speed, high performance point-to-point link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy PC buses, to be extensible to new system network architecture buses, to be transparent to operating systems, and to offer little impact on peripheral drivers.

Thus, in the embodiment of FIG. 13 a HyperTransport-based USB host controller is provided where an enhanced host controller 1320 is responsible for handling all high speed USB traffic as well as controlling port ownership for itself and the companion controllers 1310 via the port router 1350. After power-on reset or software-controlled reset of the EHC 1320, it may default to a state where all ports are owned and controlled by the companion host controllers 1310, all operational registers are at their respective default values, and the EHC 1320 is halted, i.e. it neither fetches descriptors from system memory nor issues any USB activity. In normal operation, the EHC 1320 may process isochronous and interrupt transfers from a periodic list, bulk and control from an asynchronous list. Either list can be empty or its processing disabled by software.

Figure 14:
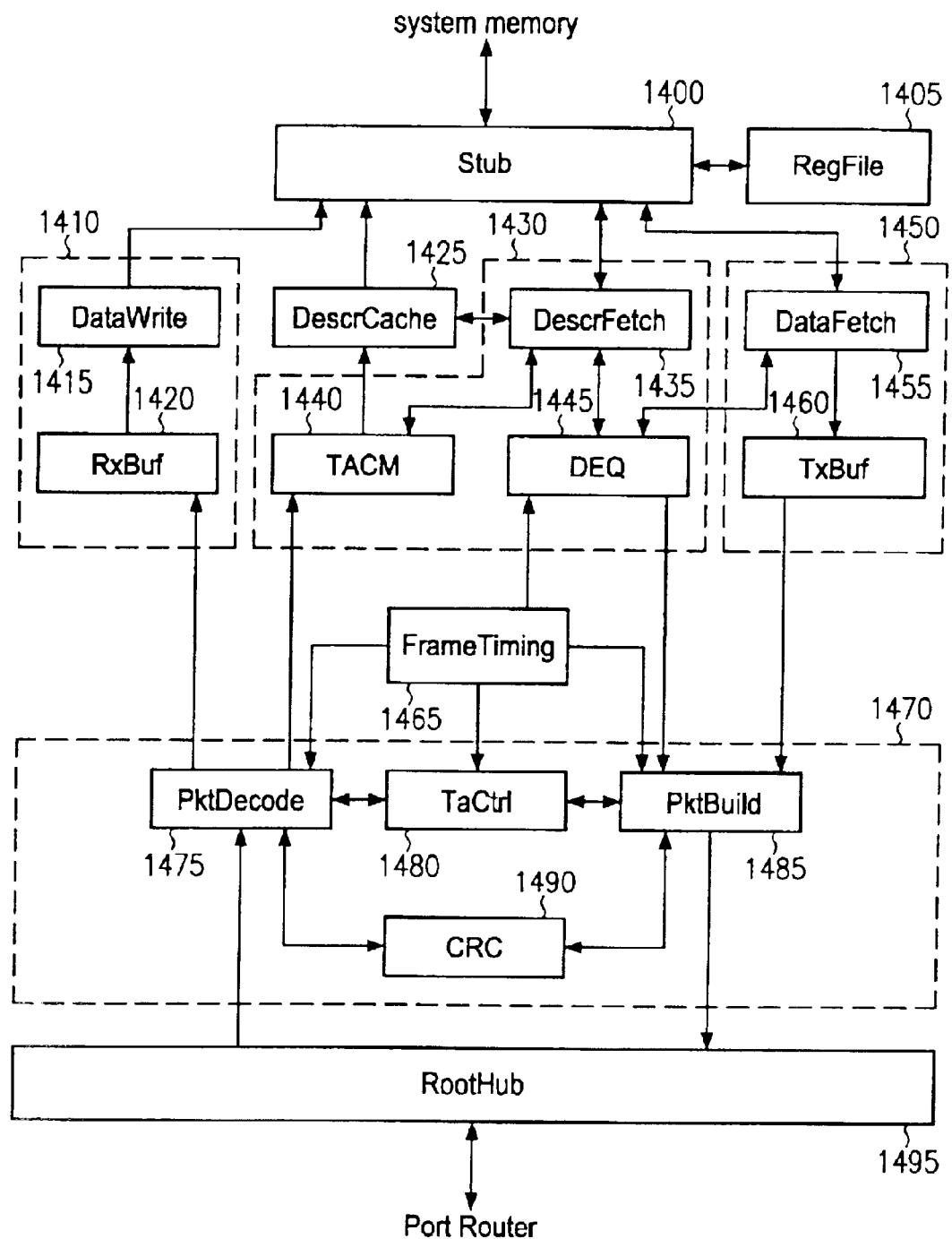
FIG. 14 is a block diagram illustrating the components of the enhanced host controller that is a component of the arrangement of FIG. 13.

Turning now to FIG. 14, the components of the enhanced host controller EHC 1320 are depicted in more detail. The handling of the data traffic to and from the system memory is done by the stub 1400. The stub 1400 assigns the internal sources and sinks to respective HyperTransport streams, i.e. posted requests, non-posted requests, responses. The stub 1400 arbitrates the internal HyperTransport interface between all internal bus masters, i.e. the receive DMA (Direct Memory Access) engine 1410, the descriptor cache 1425, the descriptor processing unit 1430 and the transmit DMA engine 1450. Thus, the stub 1400 arbitrates between descriptor fetching, writing descriptors back, receiving and transmitting data.

The stub 1400 is connected to a register file 1405 that contains the EHCI registers. In the present embodiment, the EHCI registers store data with respect to the PCI configuration, the host controller capabilities and the host controller operational modes.

The descriptor processing unit 1430 is connected to stub 1400 and consists of three subunits: the descriptor fetching unit (DescrFetch) 1435, the double-ended queue acting as data storage unit (DEQ) 1445 and the transaction completion machine (TACM) 1440. The descriptor fetching unit 1435 determines, based on timing information and register settings, which descriptor is to be fetched or pre-fetched next and sends the request to the stub 1400 and/or to the descriptor cache 1425. When it receives the descriptor it sends it to the DEQ unit 1445.

The DEQ unit 1445 holds the pre-fetched descriptors. By performing storage management, its main function is to provide a storage capacity to average memory access legacies for descriptor fetches.

The transaction completion machine 1440 is connected to the descriptor fetching unit 1435 for managing the status write-back to descriptors. For this purpose, the transaction completion machine 1440 is connected to the descriptor cache 1425.

This cache contains descriptors which have been pre-fetched by the descriptor fetching unit 1435 for fast re-access. The descriptors held in the descriptor cache 1425 are updated by the transaction completion machine 1440 and eventually written back to system memory, via stub 1400. The descriptor cache 1425 may be fully associative with write-through characteristics. It may further control the replacement of the contents of each microframe.

As apparent from FIG. 14, there are further provided the transmit DMA engine 1450 and the receive DMA engine 1410. The transmit DMA engine 1450 consists of a data fetching unit (DataFetch) 1455 and a data transmit buffer (TxBuf) 1460. The data fetching unit 1455 is the DMA read bus master and inspects the entries in the DEQ unit 1445 of the descriptor processing unit 1430. The data fetching unit 1455 pre-fetches the corresponding data and forwards it to the data transmit buffer 1460.

The data transmit buffer 1460 may be a FIFO buffer, and its function corresponds to that of the DEQ unit 1445 in that it allows to pre-fetch enough data for outgoing transactions to cover the memory system latency.

The receive DMA engine 1410 consists of the data writing unit (DataWrite) 1415 which serves as DMA write bus master unit for moving the received data that are stored in the data receive buffer (RxBuf) 1420, to its respective place in system memory. The data receive buffer 1420 may be a simple FIFO buffer.

Further, there is provided a frame timing unit (FrameTiming) 1465 that is the master USB time reference. One clock tick of the frame timing unit corresponds to an integer (e.g. 8 or 16) multiple of USB high speed bit times. The frame timing unit 1465 is connected to the DEQ unit 1445 and to the packet handler block 1470.

The packet handler block 1470 comprises a packet building unit (PktBuild) 1485 that constructs the necessary USB bus operations to transmit data and handshakes, and a packet decoder (PktDecode) 1475 that disassembles received USB packets. Further, a transaction controller (TaCtrl) 1480 is provided that supervises the packet building unit 1485 and the packet decoder 1475. Further, the packet handler 1470 comprises a CRC (cyclic redundancy check) unit 1490 for generating and checking CRC data for transmitted and received data.

The packet building unit 1485 and the packet decoder 1475 of the packet handler 1470 are connected to the root hub 1495 that contains port specific control registers, connect detection logic and scatter/gather functionality for packets between the packet handler 1470 and the port router.

Figure 15:
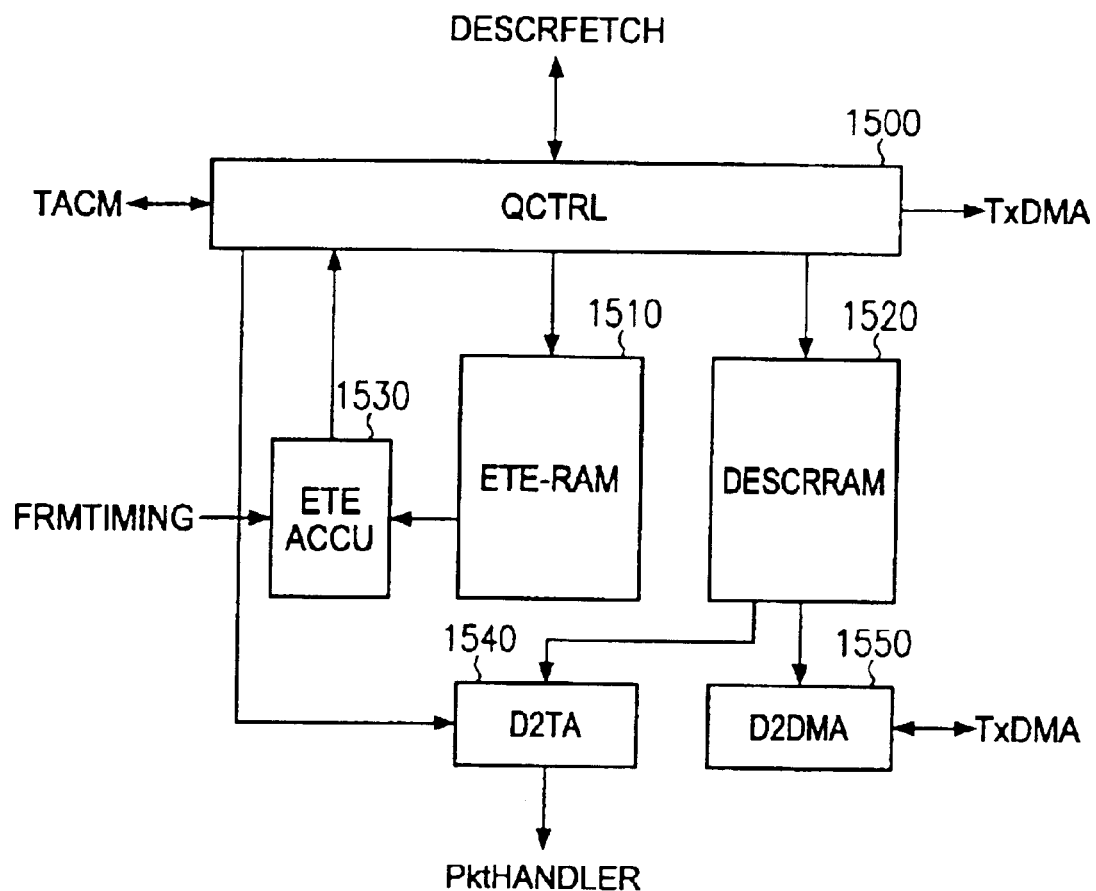
FIG. 15 is a block diagram illustrating the components of the DEQ unit shown in FIG. 14.

Turning now to FIG. 15, the DEQ unit 1445 shown in FIG. 14 is depicted in more detail. The whole double-ended queue is controlled by the controller QCTRL 1500 that also interacts with the descriptor fetching unit 1435, the transaction completion machine 1440 and the transmit DMA unit 1450. The descriptors are stored in the descriptor RAM (DESCRRAM) 1520. The data storage unit of FIG. 15 also keeps track of the estimated time enroute (ETE) for the stored descriptors. The ETE values are stored in the ETE-RAM 1510 parallel to their counterparts in the descriptor RAM 1520. The ETE accumulator (ETE-ACCU) 1530 stores a value representing the estimated time to complete for all currently queued descriptors. The accumulator is incremented with the estimated time of each newly stored descriptor and is decremented by the ETE value of the descriptor that was most recently removed. There may be further units 1540 and 1550 for interfacing to other units of the enhanced host controller.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An apparatus comprising:

a data storage unit configured to store a plurality of data items, said data storage unit including a plurality of register elements, each register element being capable of storing at least one data item, said plurality of register elements being arranged to form a sequence of register elements; and a controller configured to control said data storage unit to store first data in a first part of said sequence of register elements and second data in a second part of said sequence of register elements, said first part and said second part being of variable lengths with the sum of the variable lengths being equal to the length of said sequence of register elements;

wherein said first data is periodic data and said second data is asynchronous data, and said controller is arranged to control the first part periodically and the second part asynchronously;

wherein said first data and said second data includes data items of the same type, and said data items of the same type are transaction items; and wherein said controller is arranged for controlling said data storage unit dependent on an estimated duration of transfers represented by said transaction items.

2. An apparatus comprising:

a data storage unit configured to store a plurality of data items, said data storage unit including a plurality of register elements, each register element being capable of storing at least one data item, said plurality of register elements being arranged to form a sequence of register elements;

a controller configured to control said data storage unit to store first data in a first part of said sequence of register elements and second data in a second part of said sequence of register elements, said first part and said second part being of variable lengths with the sum of the variable lengths being equal to the length of said sequence of register elements;

a first address register identifying a first register element that forms a margin of the first part of said sequence of register elements, said first part ranging from one side of the sequence to the identified first register element;

a second address register identifying a second register element that forms a margin of the second part of said sequence of register elements, said second part ranging from the other side of the sequence to the identified second register element;

a third address register identifying a third register element indicating the filling state of the first part of said sequence of register elements; and a fourth address register identifying a fourth register element indicating the filling state of the second part of said sequence of register elements;

wherein said controller is arranged for setting a first or second hit flag when it determines that the filling state of the first or second part of said sequence of register elements is beyond the respective margin; and wherein said controller is arranged for updating the content of the first or second address register, respectively, if the respective hit flag is set.

3. A method of operating a data storage unit to store a plurality of data items, said data storage unit including a plurality of register elements, each register element being capable of storing at least one data item, said plurality of register elements being arranged to form a sequence of register elements, the method comprising:

controlling said data storage unit to store first data in a first part of said sequence of register elements; and controlling said data storage unit to store second data in a second part of said sequence of register elements;

wherein said first part and said second part are of variable lengths and the sum of the variable lengths is equal to the length of said sequence of register elements;

wherein said first data is periodic data and said second data is asynchronous data, and the method is arranged to control the first part periodically and the second part asynchronously;

wherein said first data and said second data includes data items of the same type;

wherein said data items of the same type are transaction items; and wherein the method is arranged for controlling said data storage unit dependent on an estimated duration of transfers represented by said transaction items.

4. A method of operating a data storage unit to store a plurality of data items, said data storage unit including a plurality of register elements, each register element being capable of storing at least one data item, said plurality of register elements being arranged to form a sequence of register elements, the method comprising:

controlling said data storage unit to store first data in a first part of said sequence of register elements;

controlling said data storage unit to store second data in a second part of said sequence of register elements;

operating a first address register identifying a first register element that forms a margin of the first part of said sequence of register elements, said first part ranging from one side of the sequence to the identified first register element;

operating a second address register identifying a second register element that forms a margin of the second part of said sequence of register elements, said second part ranging from the other side of the sequence to the identified second register element;

operating a third address register identifying a third register element indicating the filling state of the first part of said sequence of register elements;

operating a fourth address register identifying a fourth register element indicating the filling state of the second part of said sequence of register elements;

setting a first or second hit flag if the filling state of the first or second part of said sequence of register elements is beyond the respective margin; and updating the content of the first or second address register, respectively, if the respective hit flag is set;

wherein said first part and said second part are of variable lengths and the sum of the variable lengths is equal to the length of said sequence of register elements.

* * * * *